Figure 1:
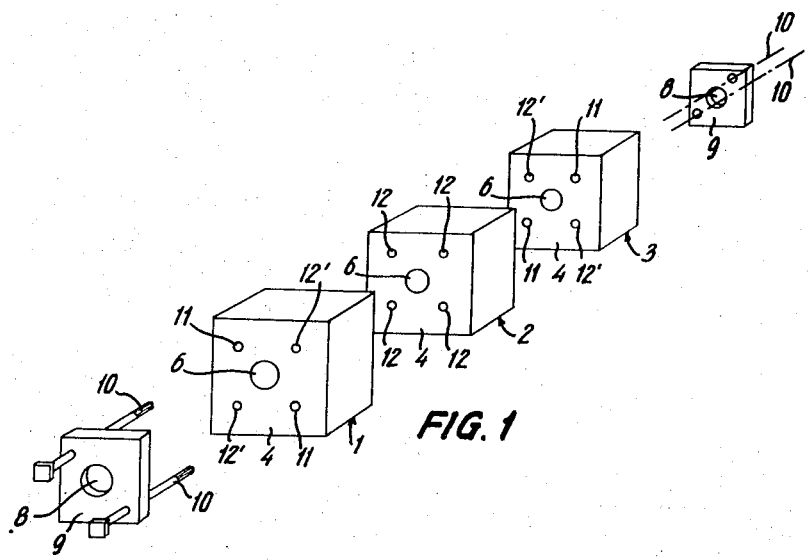

United States Patent [19]
Bonne et al.

[11] 3,863,666
[45] Feb. 4, 1975

[54] ASSEMBLY FOR INSERTION IN A FLUID CONDUIT

[75] Inventors: Adam Bonné; Jørgen Høgh, both of Copenhagen, Denmark

[73] Assignee: A/S Teknova, Niva, Denmark

[22] Filed: Aug. 1, 1973

[21] Appl. No.: 384,422

[30] Foreign Application Priority Data
Aug. 8, 1972  Denmark.............................. 3907/72

[52] U.S. Cl.................................. 137/269, 285/405
[51] Int. Cl.............................................. F16l 23/00
[58] Field of Search........ 137/269, 271, 561 R, 608; 285/363, 405

[56] References Cited
UNITED STATES PATENTS

| | | | |
|---|---|---|---|
| 3,523,600 | 8/1970 | Nelson................................ | 137/271 |
| 3,589,387 | 6/1971 | Raymond............................ | 137/271 |
| 3,654,960 | 4/1972 | Kiernan .............................. | 137/608 |
| 3,741,236 | 6/1973 | Pass et al............................ | 137/269 |
| 3,754,565 | 8/1973 | Gennetten ......................... | 137/271 X |

*Primary Examiner*—William R. Cline
*Attorney, Agent, or Firm*—Anthony A. O'Brien

[57] ABSTRACT

In an assembly including; three individual components to be series connected in a fluid flow line, for example, a filter, a controller and a lubricator for pressurized air, each component is provided with bolt receiving holes in its front and rear surfaces. One component has four threaded holes on each of its front and rear surfaces while the other two components each have two threaded holes and two unthreaded bores therethrough, all circumferentially spaced around inlet and outlet ports in the surfaces.

1 Claim, 5 Drawing Figures

ASSEMBLY FOR INSERTION IN A FLUID CONDUIT

In compressed-air systems there often exists the need to filter, regulate and lubricate the airstream and a number of different devices have been developed which can be individually inserted into the fluid conduit in an expedient manner. Similarly, in conduits for liquid flow it may be desirable to insert apparatus for controlling the temperature and volume of the flow of liquid and for a dosed admixture of other fluids.

Known components for such purposes often are manufactured and marketed quite independently of one another and are provided with connecting or coupling means of diverse types, with the result that their insertion into an existing fluid conduit can give rise to difficulties, especially when replacing one apparatus with another of a different type. Also, when two or more components are to be inserted in series it usually is necessary to insert each component between two conduit sections, causing the assembled installation to take up a relatively great deal of space.

The present invention relates to an assembly intended for insertion into a fluid conduit, such as a compressed-air pipe, and including three individual components intended to be inserted in series, e.g., for filtering, regulating and lubricating, respectively, an air-stream, and each having inlet and outlet ports for the flow of fluid in a pair of opposite external surfaces as well as threaded holes for bolts to secure the components to each other and to clamping flanges on the ends of associated conduit sections.

The assembly according to the invention differs from the prior art in that one of the individual components is provided with four bolt receiving threaded holes circumferentially spaced around the inlet and outlet ports, the holes having their centers located in the corners of a square. The other two individual components are provided with two similar threaded holes on each opposite external surface the centers of which are coincident with one pair of diagonally opposite square corners and two unthreaded bores extending in the fluid flow direction between said external surfaces, the diameter of these unthreaded bores being greater than that of the bolts, and thir centers coinciding with the other two diagonally opposite square corners.

As will be understood from the subsequent description of an embodiment of the assembly according to the invention, this offers a number of combination or assembling possibilities in order to meet an existing need and, by means of various bolt connections, it will be possible to assemble two or more of the individual components directly with one another, thus resulting in a substantial saving in both assembly work and space.

In the accompanying drawings

Figure 2:
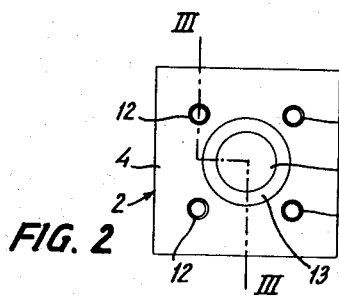
Figure 3:
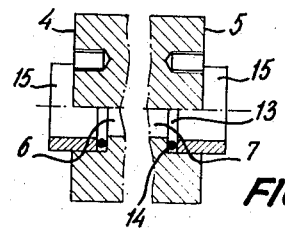
Figure 4:
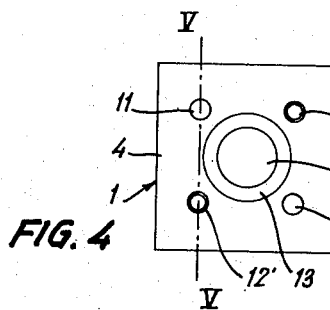
Figure 5:
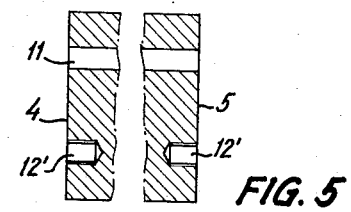

FIG. 1 shows an exploded perspective view of an embodiment of the assembly according to the invention, FIG. 2 a front or rear elevation of the centremost of the three apparatuses, FIG. 3 a section taken along the broken line III in FIG. 2, FIG. 4 a view, corresponding to FIG. 2, of the foremost apparatus as shown in FIG. 1, and FIG. 5 a section taken along the line V—V in FIG. 4.

The equipment illustrated in FIG. 1 includes three aligned components intended to be inserted in series into a compressed-air pipe (not shown) and which, by way of example, may be a filter 1, a regulator 2 and a lubricating device 3, respectively. Each of these components, the internal construction of which has no bearing on the present invention, has a cubical housing which, on opposing external front and rear surfaces 4 and 5 (FIGS. 3 and 5), is provided with inlet ports 6 and outlet ports 7 that are aligned with each other as well as with central holes 8 in a pair of terminal flanges 9 which are assumed to be connected in a suitable way with the fluid conduit portions that are not depicted.

The foremost terminal flange 9 is provided with a pair of clamping bolts 10 which, through a pair of unthreaded holes 11 in the foremost component 1, can be screwed into a pair of threaded holes 12 in the next component 2. In a similar manner the rearmost terminal flange 9 is fitted with bolts 10 that are not shown and which, through unthreaded bores 11 in the rearmost component 3, can be screwed into threaded holes in the rear surface of component 2. The component 2, in both its front and rear surfaces is provided with four threaded holes 12, the centers of which are located in the corners of a square around the inlet port 6 and the outlet port 7. Similarly, the centers of the unthreaded bores 11 in the components 1 and 3 correspond with one pair of diagonally opposite square corners, and in their front and rear surfaces these components 1 and 3 are also provided with a pair of threaded holes 12' having their centers located at the other two square corners. The threaded holes 12', as well as two of the threaded holes 12 in the front and in the rear portion of the centermost apparatus 2, are not employed in the assembling possibility illustrated in FIG. 1. They may, however, be used in other situations. If, for instance, the components 2 and 3 are to be omitted from the combination, the foremost flange 9 may be turned by 90° and then bolted onto the foremost apparatus 1 by means of short bolts fitting into the threaded holes 12'. In addition, the arrangement shown with threaded holes and unthreaded bores permits each to be turned by steps of 90° so as to be clamped together in the position which, depending on the circumstances, happens to be the most convenient one.

As shown in FIGS. 2, 3 and 4, the inlet and outlet ports 6 and 7 may be surrounded by annular seats 13 with a sealing ring 14 which creates a seal between the housing of the apparatus and a coupling sleeve 15.

What is claimed is:

1. An assembly to be inserted into a fluid conduit comprising
    first, second and third components to be inserted in series into the conduit, each component having opposite external surfaces having a port defined therein to allow fluid flow therethrough,
    a clamping flange on each of two fluid conduit sections between which the components are to be inserted, and
    a pair of bolts for each flange,
    characterized in that
    said second component has four threaded bolt receiving holes on each of its opposite surfaces circumferentially spaced around the respective port in each surface, the centers of the holes defining a square,
    said first and third components each have a pair of bores therethrough opening in each of said opposite surfaces and a pair of threaded bolt receiving holes in each of said surfaces, the centers of the bores and holes on each surface defining a square with the bores being located at diagonally opposite corners, and
    the bolts project through the flange and through the bores in said first and third components to engage the threaded holes in said second component.

* * * * *